(12) United States Patent
Paek et al.

(10) Patent No.: US 7,620,631 B2
(45) Date of Patent: Nov. 17, 2009

(54) PYRAMID VIEW

(75) Inventors: Timothy S. Paek, Sammamish, WA (US); Ronald K. Logan, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 885 days.

(21) Appl. No.: 11/085,731

(22) Filed: Mar. 21, 2005

(65) Prior Publication Data

US 2006/0212817 A1 Sep. 21, 2006

(51) Int. Cl.
*G06F 17/30* (2006.01)
(52) U.S. Cl. .................... 707/5; 707/3; 715/745
(58) Field of Classification Search .............. 707/3, 707/5; 715/745
See application file for complete search history.

(56) References Cited

U.S. PATENT DOCUMENTS

| | | | | |
|---|---|---|---|---|
| 5,724,567 A * | 3/1998 | Rose et al. | ................ | 707/2 |
| 5,754,939 A * | 5/1998 | Herz et al. | ................ | 455/3.04 |
| 6,285,999 B1 * | 9/2001 | Page | ................ | 707/5 |
| 6,327,590 B1 * | 12/2001 | Chidlovskii et al. | ............ | 707/5 |
| 6,385,619 B1 * | 5/2002 | Eichstaedt et al. | ....... | 707/104.1 |
| 6,728,704 B2 * | 4/2004 | Mao et al. | ................ | 707/3 |
| 6,912,505 B2 * | 6/2005 | Linden et al. | ................ | 705/14 |
| 2002/0024532 A1 * | 2/2002 | Fables et al. | ................ | 345/700 |
| 2002/0087522 A1 * | 7/2002 | MacGregor et al. | ............ | 707/3 |
| 2002/0194166 A1 * | 12/2002 | Fowler | ................ | 707/3 |
| 2002/0198882 A1 * | 12/2002 | Linden et al. | ................ | 707/10 |
| 2003/0233345 A1 * | 12/2003 | Perisic et al. | ................ | 707/3 |
| 2004/0267700 A1 * | 12/2004 | Dumais et al. | ................ | 707/2 |
| 2005/0222989 A1 * | 10/2005 | Haveliwala et al. | ............ | 707/3 |

FOREIGN PATENT DOCUMENTS

EP 1050830 A2 * 11/2000
WO WO 03/107127 A2 * 12/2003

OTHER PUBLICATIONS

Sergey Brin et al., "The Anatomy of a Large-scale Hypertextual Web Search Engine", Computer Networks and ISDN Systems, vol. 30, No. 1-7, Apr. 1998, pp. 107-117.*
Junghoo Cho et al., "Efficient crawling through URL ordering", Computer Networks and ISDN Systems, vol. 30, No. 1-7, Apr. 1998~ pp. 161-171, pp. 161-171.*
Haveliwala, Taher H., "Topic-Sensitive PageRank", Proceedings of the Eleventh International World Wide Web Conference, Honolulu, Hawaii, May 2002, 10 Pages.*

* cited by examiner

*Primary Examiner*—Shahid A Alam
(74) *Attorney, Agent, or Firm*—Lee & Hayes, PLLC

(57) ABSTRACT

A system for displaying information to a user is disclosed. The system comprises a grouping module that organizes data items into groups that are ranked based upon at least one attribute of the data items. Also included is a presentation module that presents the ranked groups of data items to a user along with a group indicator. Methods for using the disclosed system are additionally provided.

19 Claims, 12 Drawing Sheets

PYRAMID VIEW

TECHNICAL FIELD

The disclosed invention generally relates to searches for information in a machine-readable format, and specifically to systems and methods for presenting results of such searches to a user.

BACKGROUND

The amount of data available to information seekers has grown astronomically. The proliferation of information sources on the Internet and on private networks provides challenges in a variety of areas but especially in areas related to searching for specific pieces of data among all those available. A closely related problem is the need to present located information in a manner that allows a human user to quickly identify useful pieces of needed information in an intuitive and logical manner.

A number of tools have been created to assist human users in the tasks of searching for and sorting through information stored in computer systems. Among the most prevalent are graphical environments and web browsers that have been adapted for information searching. Even using these tools, however, information searching and sorting can be a complex and arduous endeavor.

A number of factors, either alone or in combination, can contribute to difficulty for a human user to find desired information using a computer interface such as a graphical user interface ("GUI") or a web browser. Among those factors are large numbers of items in search results; terse or unhelpful descriptions of results; relatively small or limited areas within which to display results, either within a window or on an entire screen; or the inability to present a complete set of search results, usually necessitating the placement of at least one potentially desired result item on another page of results to which a user must navigate.

Often, interfaces for search engines are based upon web browsers and use static style sheets for displaying a name of a data item, a description of the item, and a location, such as a uniform resource locator ("URL") for the item. Formatting for results is usually the same for each item in a result set and for every user. Generally, there is a trade-off between the ability to show information to the user with a useful level of detail and the amount of space that is available to present information.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In accordance with one aspect of the invention, a user interface can present results of searches for information in a grouped format so that a user can readily identify result items that are most likely to contain information desired by the user. The group format can be arranged to increase the amount of information presented to the user at one time and also provide useful information about the results themselves. The grouped format can employ differing numbers of columns, different typefaces and type sizes, color-coding, and labeling using graphics to signify different groupings.

Regarding this specific aspect of the invention, results that are deemed more likely to be responsive to the user's search query can be displayed in a first group in a single-column layout, in a large typeface, associated with a first color, and optionally associated with a graphical indicator. Results in this group are presented as full versions but optionally can be presented in a summary version. Results that are deemed to be less responsive can be presented in a second group in a dual-column layout, in a relatively smaller typeface, associated with a second color, optionally associated with a second graphical indicator, and can be in a summary format. Still less responsive results can be presented in a third group having a three-column layout, in a still smaller typeface, associated with a third color and optionally a third graphical indicator, and typically in a summary format.

In accordance with another aspect of the invention, a search interface can create summaries of result items for presentation to a user. The user can then examine the information in results in summary form and determine, based upon the summary, whether the summary result is worthy of further investigation. The user can then select the summary, for example, when using a graphical operating environment, by mousing-over the summary, by clicking on the summary, or by another suitable action. Upon selection of the summary by the user, the interface can present a full version of the item for the user's examination. The user can then select the full version, or a portion thereof, to navigate to a desired piece of information. If the user determines the item is not one that the user desires to examine further, the user can continue to examine other displayed items. If the user examines other items, the interface can replace the full version with the summary.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
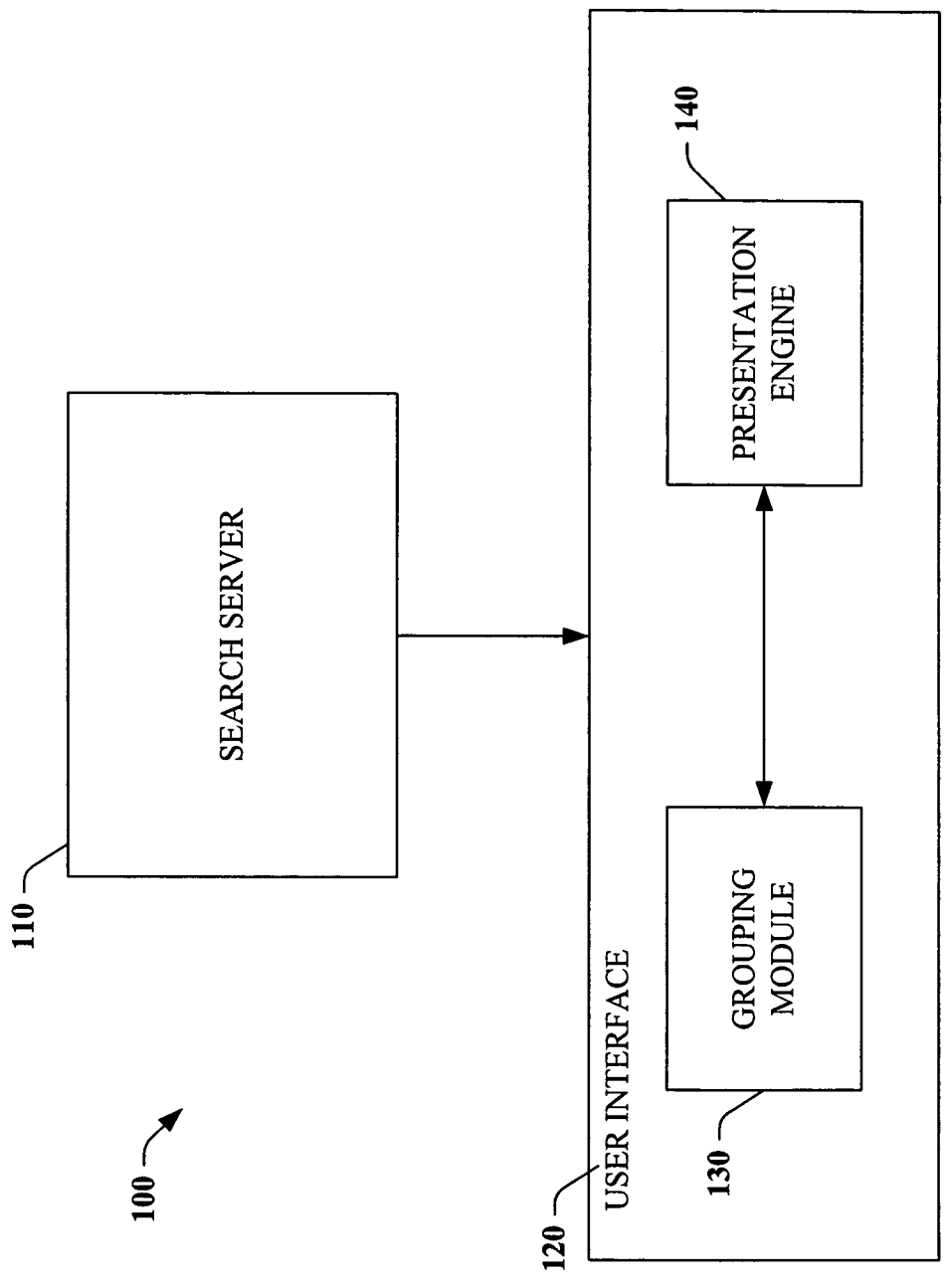
FIG. 1 is a system block diagram of an information presentation system in accordance with one aspect of the disclosed invention.

The subject invention relates to systems and methods to facilitate searches of data. As used in this application, terms "component," "system," and the like are intended to refer to a computer-related entity, either hardware, software (e.g., in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention. Additionally, although specific examples set forth may use terminology that is consistent with client/server architectures or may even be examples of client/server implementations, skilled artisans will appreciate that the roles of client and server may be reversed, that the subject invention is not limited to client/server architectures and may be readily adapted for use in other architectures, specifically including peer-to-peer (P2P) architectures, without departing from the spirit or scope of the invention.

It should also be appreciated that although specific examples presented may describe or depict systems or method that are based upon searches of web pages on the Internet, the invention is not limited to that domain. For example, the invention may also be employed on an intranet or a private network. Additionally or alternatively, the invention can be used entirely on a single machine as part of a desktop search system. Those of ordinary skill in the art will readily recognize that the disclosed invention can be used to search for other types of information besides web pages, such as database queries, photograph information, and audio or video information, among others.

FIG. 1 is a system block diagram of an information presentation system 100 in accordance with one aspect of the disclosed invention. The system 100 includes a search server 110 that is operatively coupled to a user interface 120. The search server 110 can be a search engine for searching through web pages in the Internet or an intranet. A specialized search component for locating specific types of information, for instance, photographs of a particular scene, can also be used as the search server 110. The search server 110 can also be a component located on a user's local machine.

The user interface 120 can be a GUI that includes appropriate data entry and display elements or can be a graphical file system browser, such as a browser of the type used to navigate among sites on the World Wide Web. The user interface 120 can also be a text-based browser or other text-based interface. The user interface 120 includes a grouping module 130 and a presentation engine 140. The grouping module 130 serves to organize or categorize search results into groups for presentation to the user. The presentation engine 140 serves to place search results in a human-understandable format. A rendering engine such as a rendering engine for a web browser or a GUI, or another suitable component can be used as the presentation engine 140.

In operation, the user interface 120 sends a user-created search query to the search server 110. The search server 110 performs a search to locate information that is likely to be responsive to the query and sends results of that search to the user interface 120. The results preferably include ranking information either in the form of an inherent ranking, in the form of a data tag, or in some other suitable form. Alternatively or additionally, a separate ranking component can rank results on the user's local machine.

The grouping module 130 then uses ranking information of the results to group individual items in the set of results. For example, the top five percent of all results, that is, the five percent of results having the highest ranking, can be placed in a first group. The next ten percent can be placed in a second group, and so on until all items have been grouped. The presentation engine 140 then presents the grouped items to the user.

As will be appreciated by those artisans of ordinary skill in this field, various portions of the disclosed system may include or consist of artificial intelligence-based components. For example, the search server 110 may use a neural network to identify responsive items to include in search results. The grouping module 130 may use a support vector machine to classify result items for inclusion into groups. Other classifiers may also be employed to assist in various portions or aspects of search query creation or result presentation.

A classifier is a function that maps an input attribute vector, $X=(X_1, X_2, X_3, X_4, \ldots X_n)$, to a confidence that the input I belongs to a class, that is, $f(I)=\text{confidence(class)}$. Such classification can employ a probabilistic and/or statistical-based analysis, for example, factoring utilities and costs into the analysis, to prognose or infer an action that a user desires to be automatically performed. In the case of information searching on the World Wide Web, for example, attributes can be metrics such as keyword counts, number of links into a page, number of links out from a page, the appearance of keywords in metadata tags, or other data-specific attributes derived from the structure, format, or content of a datum; and the classes are categories or areas of interest such as a measure of responsiveness to a query.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained, for example, using generic training data, as well as implicitly trained, such as by observing user behavior or receiving extrinsic information. For example, SVM's are configured using a learning or training phase within a classifier constructor and feature selection module. Thus, the classifier(s) can be used to automatically perform a number of functions.

Figure 2:
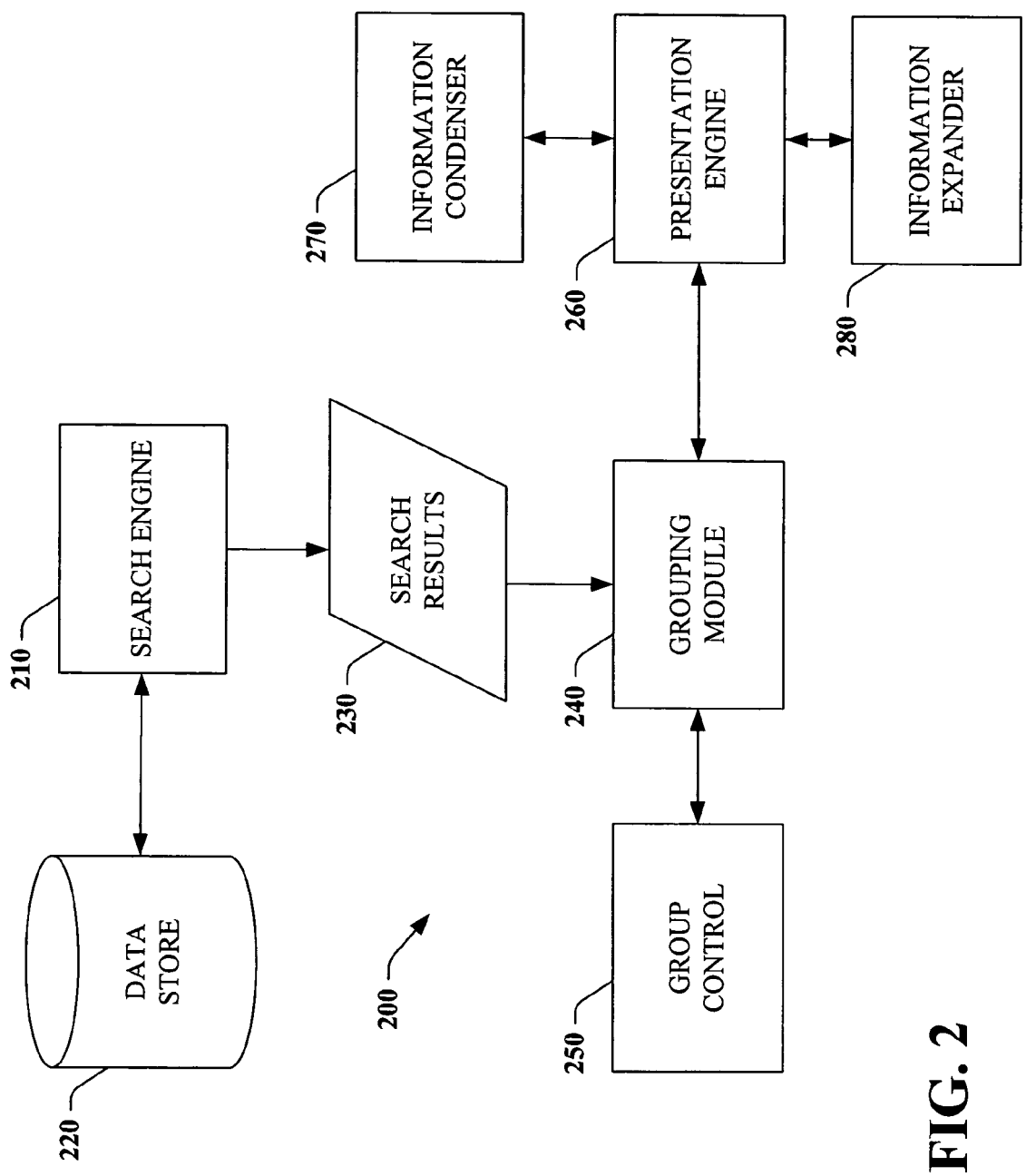
FIG. 2 is a system block diagram of a search and information presentation system in accordance with another aspect of the invention.

FIG. 2 is a system block diagram of a search and information presentation system 200 in accordance with another aspect of the invention. The system 200 includes a search engine 210 that accesses a data store 220 of information. The data store 220 can be a relational database, an object-oriented database, a flat or formatted text file, or another suitable data structure. The search engine 210 sends a set of search results 230 to a grouping module 240. The set of search results 230 includes individual items that the search engine 210 has determined are responsive to a query. Individual items of the search results 230 can be ranked or merely capable of being ranked in relation to one another within the set.

The grouping module 240 obtains group control information from a group control 250. Group control information includes parameters, such as percentage thresholds or other desired parameters, that can be used to determine whether an item in a search result belongs in a particular group. These parameters can be predefined by a user or automatically or dynamically set during operation. The group control 250 can be employed by the user during a review of search results to change parameters as well.

The grouping module 240 is connected to the presentation engine 260. The presentation engine 260 is also connected to an information condenser 270 and an information expander 280. During use, the presentation engine 260 accesses grouping information from the grouping module 240 and lays out a presentation page based in part on that information. For example, the presentation engine 260 can use the fact that there are three groups, along with the number of items in each group, to determine how much display area to allocate to each group. The presentation engine 260 can also determine whether the number of items in a group, as compared with the area allocated for that group, exceeds a certain threshold. If so, the presentation engine 260 can direct the information condenser 270 to create an abbreviated version, for example, a summary or a synopsis, of each item in that group.

The presentation engine 260 will cause the abbreviated version of items to be displayed to the user. When the user selects an abbreviated version, such as by mousing-over the abbreviated version on a screen or by another method, the presentation engine 260, along with the information expander 280, will cause the full or original version of the item to be displayed to the user. By using condensed or abbreviated versions of items, more items can be placed in a display area for a user to review. Additionally, if condensed or abbreviated versions of items in search results are only used for lower-ranked items, a user can immediately ascertain that the condensed items are less likely to be responsive to the query and thus spend less time examining those items.

Figure 3:
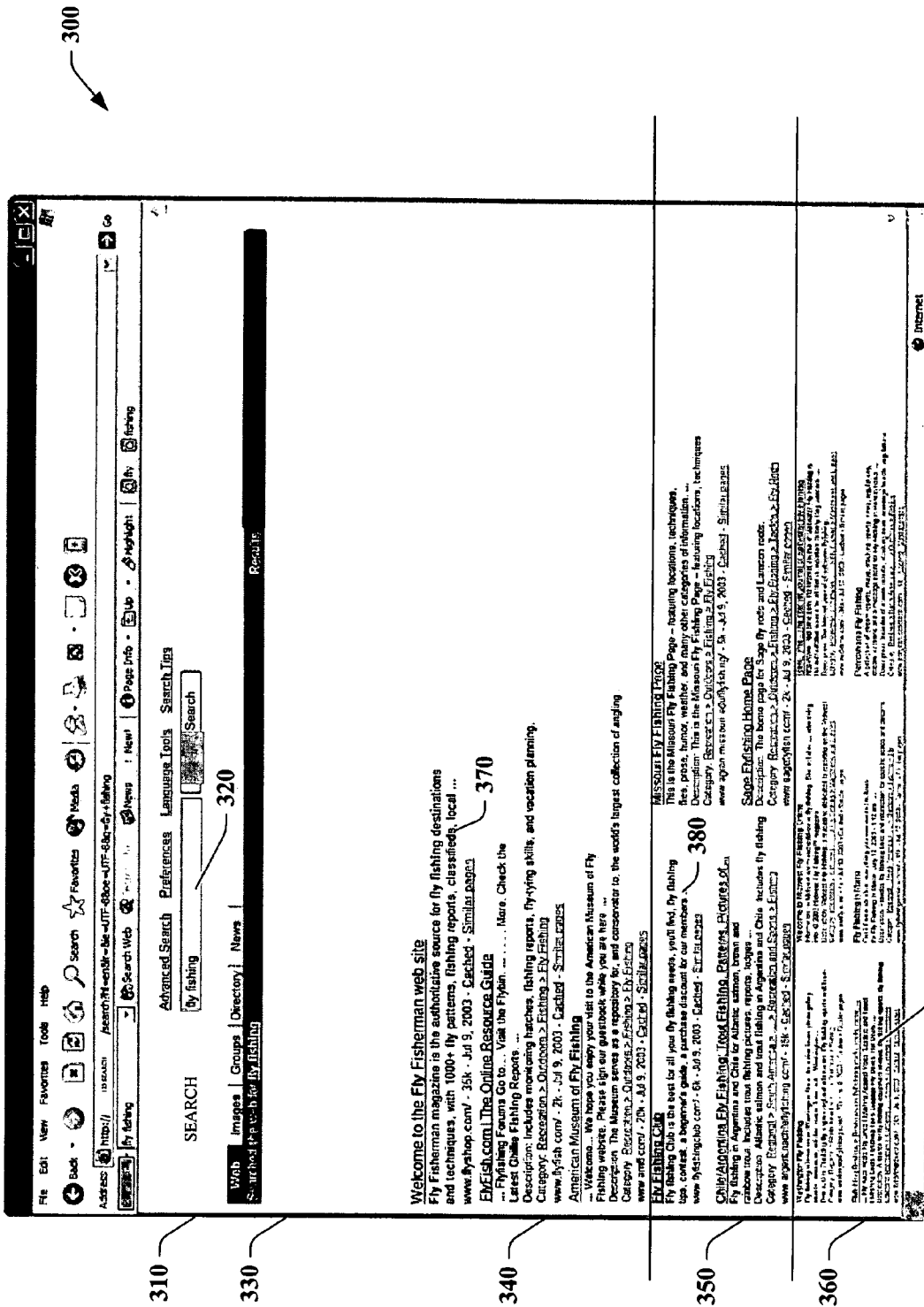
FIG. 3 is a diagram of a graphical user interface in accordance with still another aspect of the invention.

FIG. 3 is a diagram of a graphical user interface 300 in accordance with still another aspect of the invention. The interface 300 is shown as implemented on a web browser platform. The interface shown includes a query area 310 that includes a query entry field 320 and a result area 330. The result area 330 is divided into three display zones, 340, 350, 360 that each correspond to a group of result items. Although a total of three display zones are pictured, a greater or fewer number of display zones can be used. The number of display zones can even be a user-selectable preference, either directly or as a consequence of other user actions as depicted and discussed in later drawings and text.

Search result items in the first zone 340, such as item 370, received the highest ranking and can have other attributes that were selected by the user to cause those results to be placed in the first group. These result items are perceived to be most likely candidates for the information for which the user searched and therefore are presented to the user as a full version with the largest size type, and in a single-column layout. In the second zone 350, abbreviated result items, such as abbreviated result item 380, are presented in a two-column layout and in a smaller type size. Similarly, result items in the third zone 360, such as result item 390, are presented in a three-column layout and in a still smaller type size. This presentation technique allows for a greater number of results to be displayed to the user while still focusing the user's attention on those items deemed most likely to be the desired result. As will be appreciated by artisans in this area, effects such as the creation of zones, columns, and typeface definitions can be accomplished using technologies such as hypertext markup language ("HTML") and/or JavaScript, or similar techniques.

Figure 4:
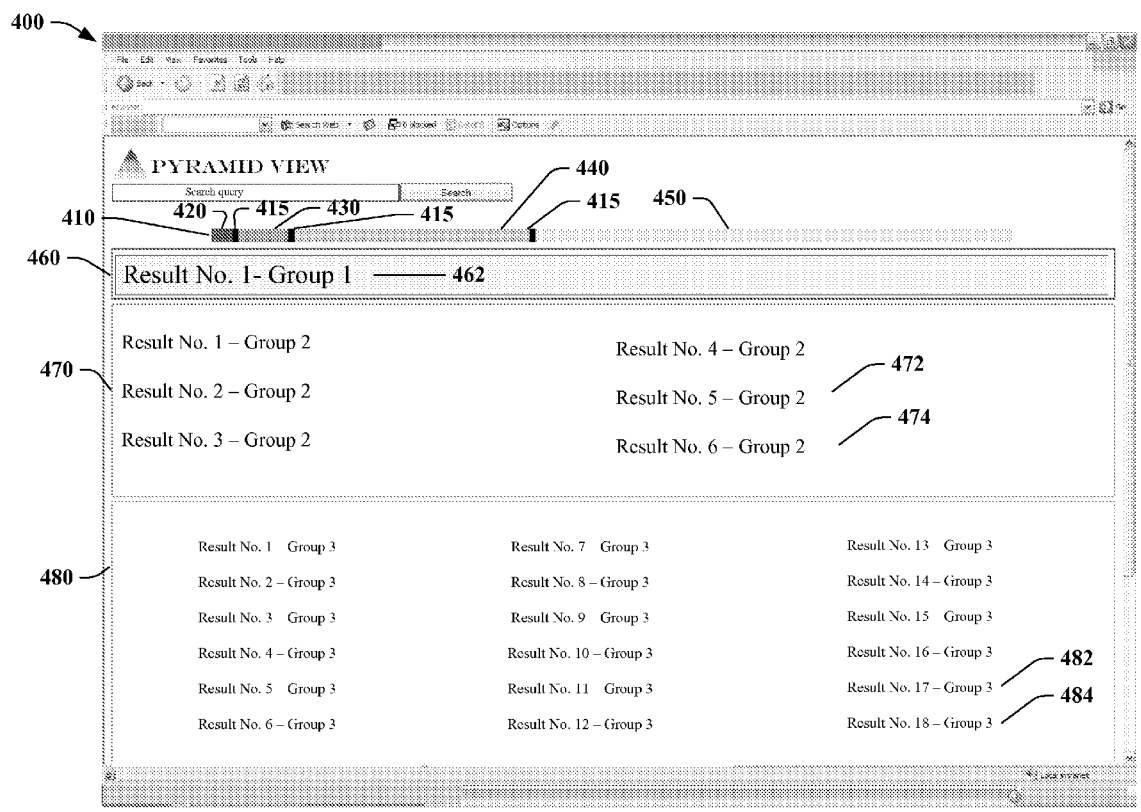
FIG. 4 is a diagram of a graphical user interface in accordance with yet another aspect of the invention.

FIG. 4 is a diagram of a graphical user interface 400 in accordance with another aspect of the invention. The GUI 400 includes a user control 410 in the form of a set of sliders 415 that can be repositioned by the user to control grouping. In this specific example, repositioning any of the sliders 415 changes the percentage allocated to each group. The user control can be color coded with different colors 420, 430, 440, 450, wherein each color corresponds to a group. Items within each group can be color-coded to provide an indication to a user that results so coded with that color are more or less likely to contain results that the user is interested in seeing.

In the specific example depicted, results in group display zones are bounded by a colored box, such as colored boxes 460, 470, 480. It should be noted that using a bounding box is not the only means that can be used to color-code the results. Text associated with each result item can be rendered in that color. Additionally or alternatively, links to source information can be rendered in an appropriate color. Also, background colors that correspond to each group can be used.

A first display zone, bounded by the first colored box 460, includes a single result 462. The result 462 is presented in a large typeface for clarity and emphasis so that a user can recognize that the result 462 is rated as highly likely to be responsive to the user's search query. A second display zone is bounded by the second colored box 470 and includes a group of results, specifically including results 472 and 474. Results in the second display zone are presented in a smaller typeface as the result 462 in the first display zone so that the user can recognize that the results in the second display zone are rated as less likely to be responsive to the user's search query. Similarly, a third display zone is bounded by the third colored box 480 and includes a group of results, specifically including results 482 and 484. Results in the third display zone are presented in a smaller typeface as the results 472, 474 in the second display zone so that the user can recognize that the results in the third display zone are rated as still less likely to be responsive to the user's search query than results in the other discussed zones.

Figure 5:
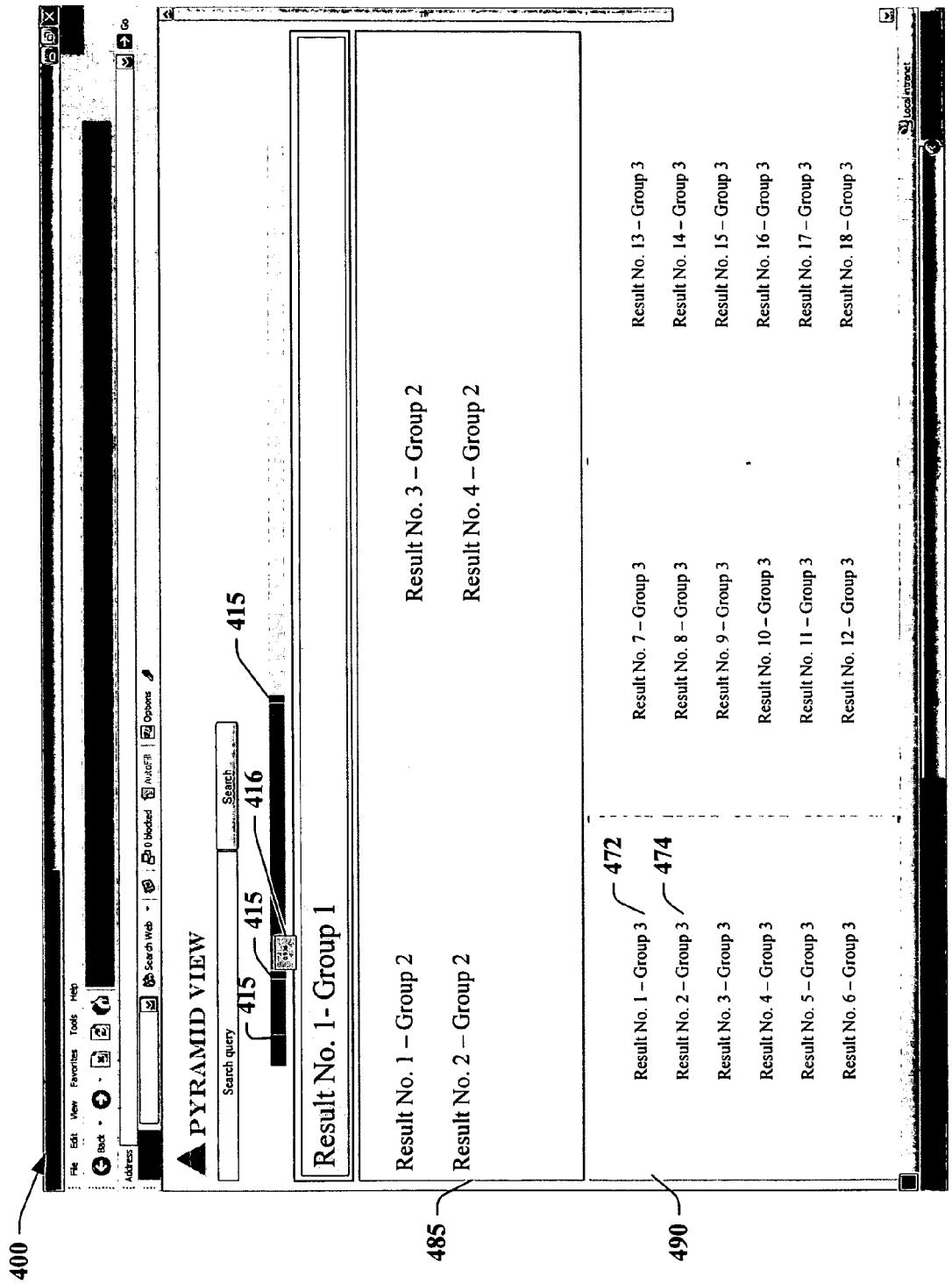
FIG. 5 is a diagram of a graphical user interface in accordance with yet another aspect of the invention.

FIG. 5 shows the same result set as FIG. 4. However, slider 415 of FIG. 5 has been repositioned. A percentage box 416 shows that the slider 415 is positioned so that results in the top 93.6% fall into either of groups 1 or 2 and results below that percentage fall into either of groups 3 or 4. Notice that the second group 485 of FIG. 5 contains four results as compared with the second group of FIG. 4 that contains six results. Based partly upon repositioning of the slider 415, two of the results 472, 474 were reassigned to the third zone 490 and the regrouped set of results re-presented to the user. These and other on-screen presentations discussed can be implemented using web browsing technology such as HTML, extensible markup language XML, and JavaScript, among others.

It should be appreciated that color-coding and display size are not the only ways of highlighting information of interest to the user. For example, extra content, such as a thumbnail image, an icon, or another graphical indicator, can be displayed for higher-rated results or for full versions of abbreviated results. Although not pictured, multiple controls or a multi-purpose control can be provided to allow users to define or set a number of parameters or presence of extra content. Such parameters or extra content can include a date of a result item, a file size, existence or availability of graphical, audio, or video information, a number of query terms present in a web page, a number of hyperlinks in a web page, or a number of images in a web page, among others.

Figure 6:
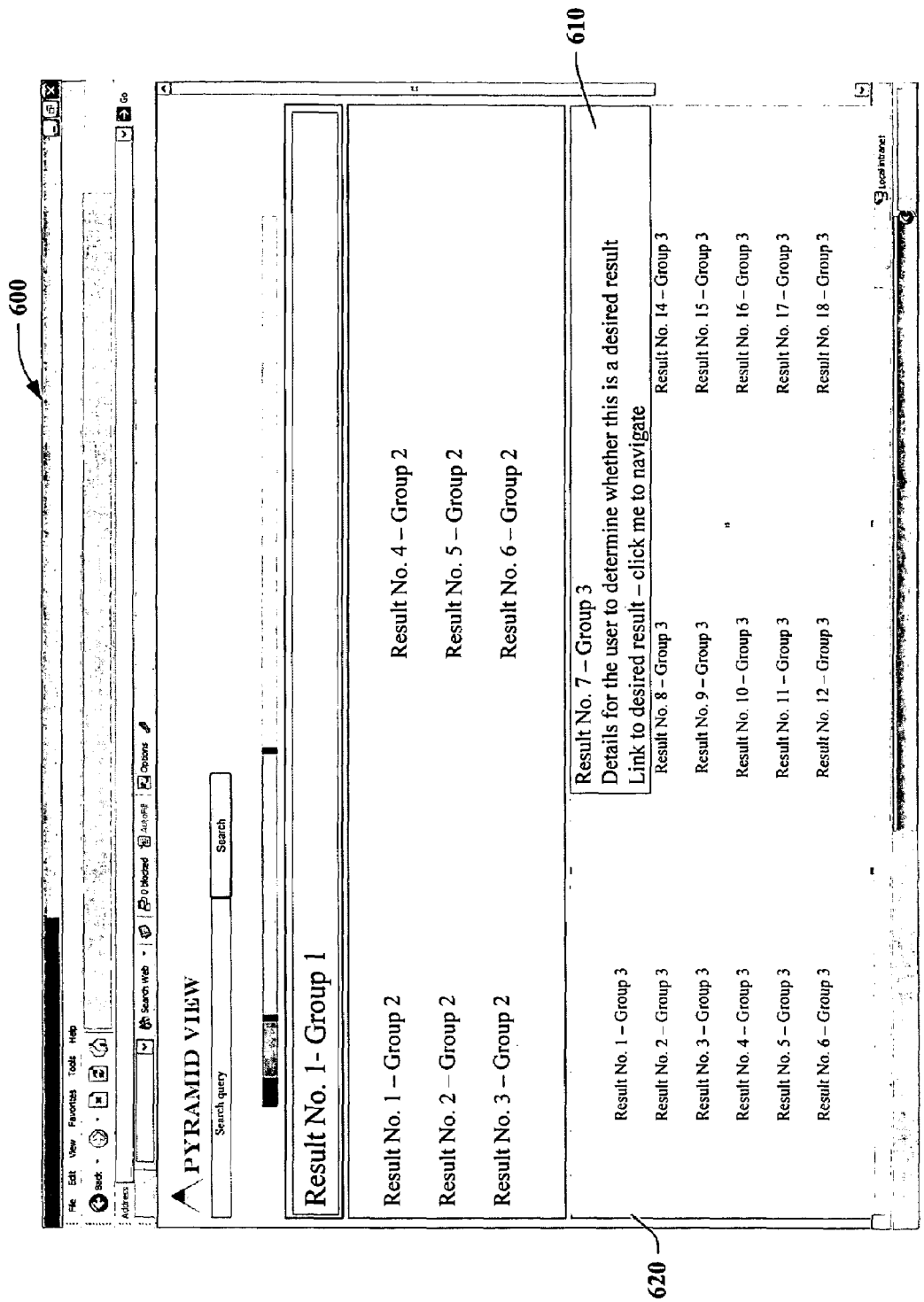
FIG. 6 is a diagram of a graphical user interface in accordance with another aspect of the invention.

Turning now to FIG. 6, a GUI 600 is shown in accordance with yet another aspect of the invention. The GUI 600 includes an expanded item 610. As shown, a user has moused-over an abbreviated or summary result item in a third zone 620. This action is taken by the system to be an indication that the user is interested in that abbreviated result item. Upon mouse-over, the full version of the result item is presented to the user. The full version may, and usually will, obscure other result items in that zone. Any links to source data that are included in the result item are live and can be activated by the user simply by clicking upon the link. Upon mouse-out, the full version of the result item is replaced with the abbreviated version.

Figure 7:
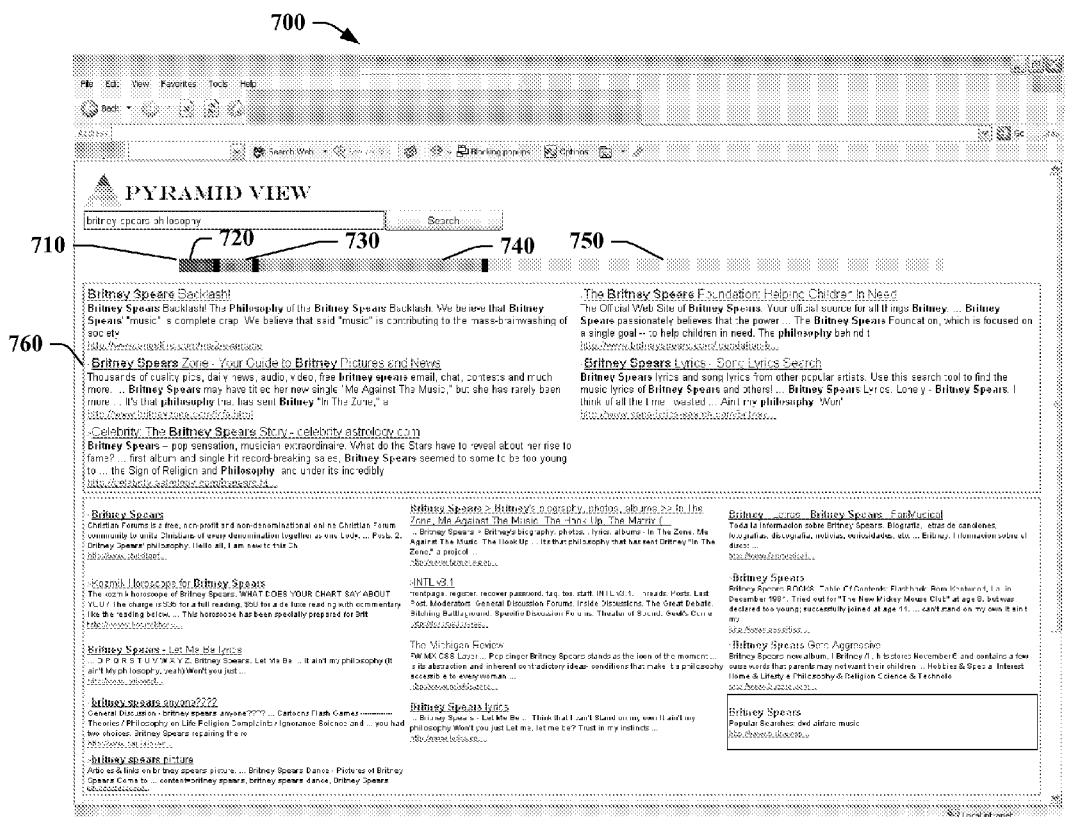
FIG. 7 is a diagram of a graphical user interface in accordance with still another aspect of the invention.

FIG. 7 is a diagram of a graphical user interface 700 in accordance with still another aspect of the invention. The GUI 700 includes a user control 710 that has colored regions 720, 730, 740, 750 that correspond to colors assigned to groups of result items. The GUI 700 shows an example of relevance feedback available to a user so that the user can immediately gauge the quality of the search result. Presentation of search results begins with results in a second group as indicated by a two-column format in the area bounded by colored bounding box 760. The color of bounding box 760 is the same as the color of region 730 of the user control 710. This presentation lets the user know immediately that there are no results ranked high enough to fall into a first group as that group is currently defined.

Figure 8:
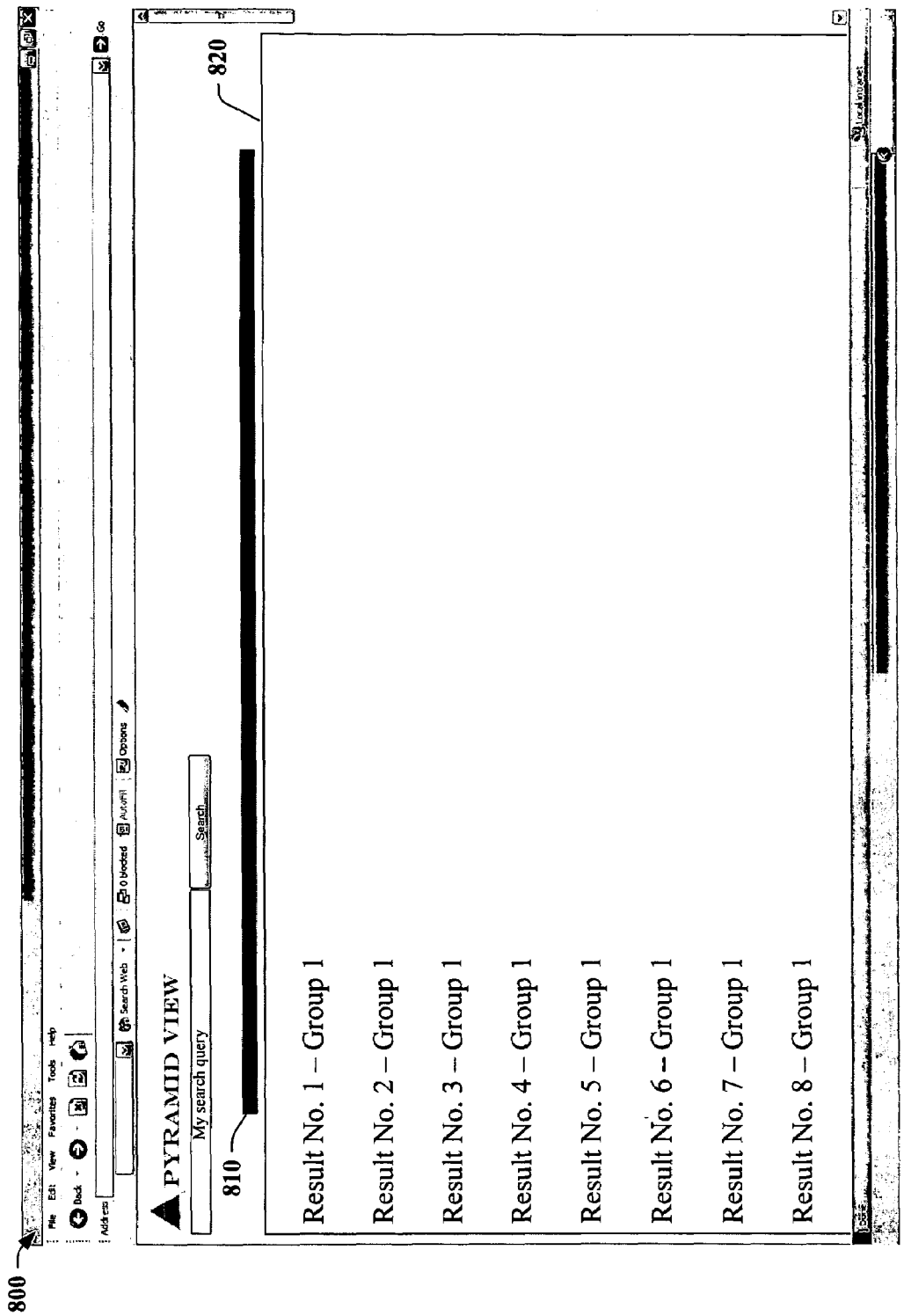
FIG. 8 is a diagram of a graphical user interface in accordance with still another aspect of the invention.

FIG. 8 is a diagram of a graphical user interface 800 in accordance with still another aspect of the invention. The GUI 800 includes a user control 810. Sliders of the user control 810 have been moved all the way to the right, effectively defining a first group as including all results. Consequently, a single zone 820, which includes a single-column layout, is presented to the user. In this format, the presentation of result items resembles a traditional presentation, effectively allowing a means by which the user can disable the functioning of the presentation system.

Figure 9:
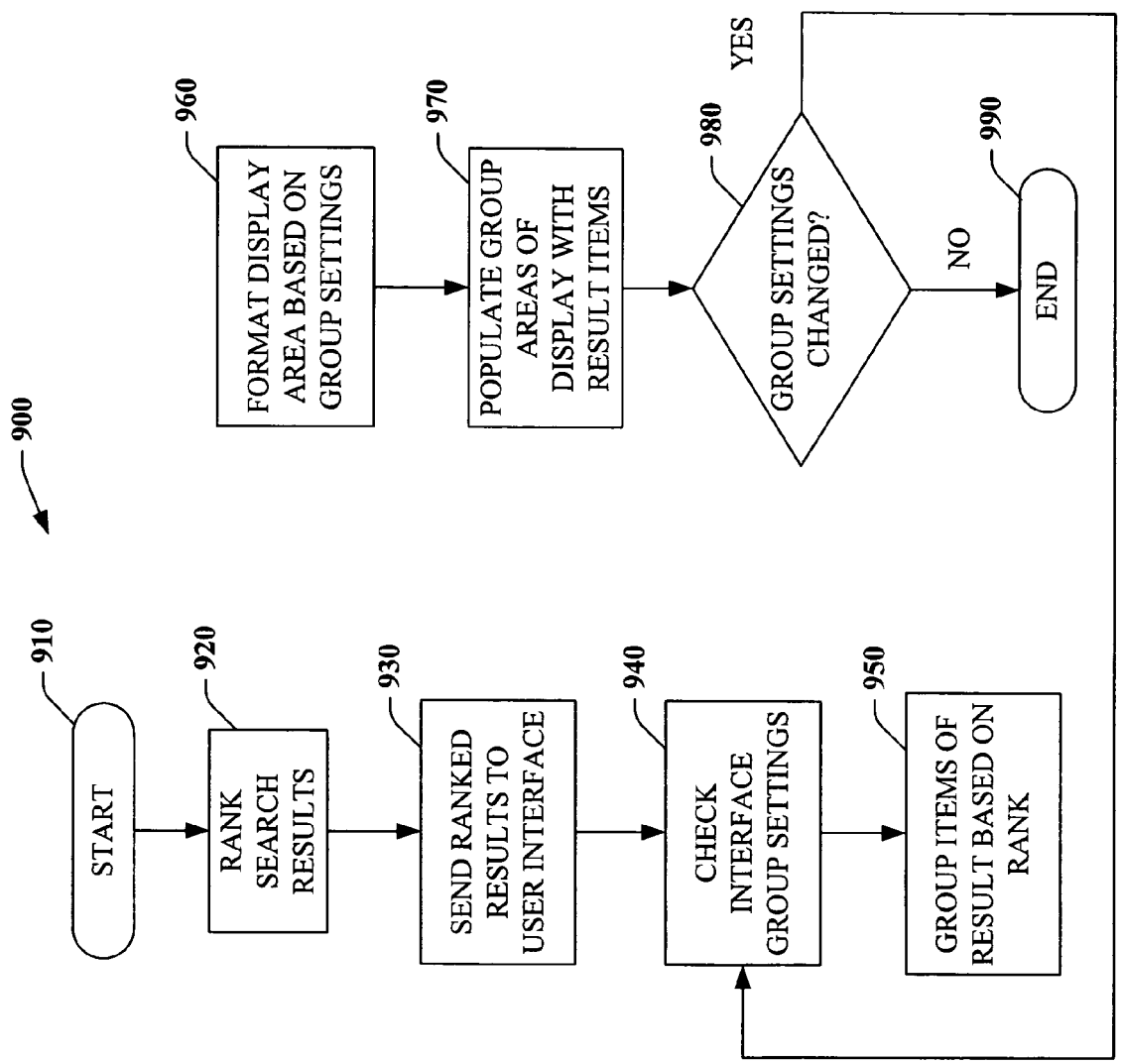
FIG. 9 is a flow diagram of a process in accordance with a further aspect of the invention.
Figure 10:
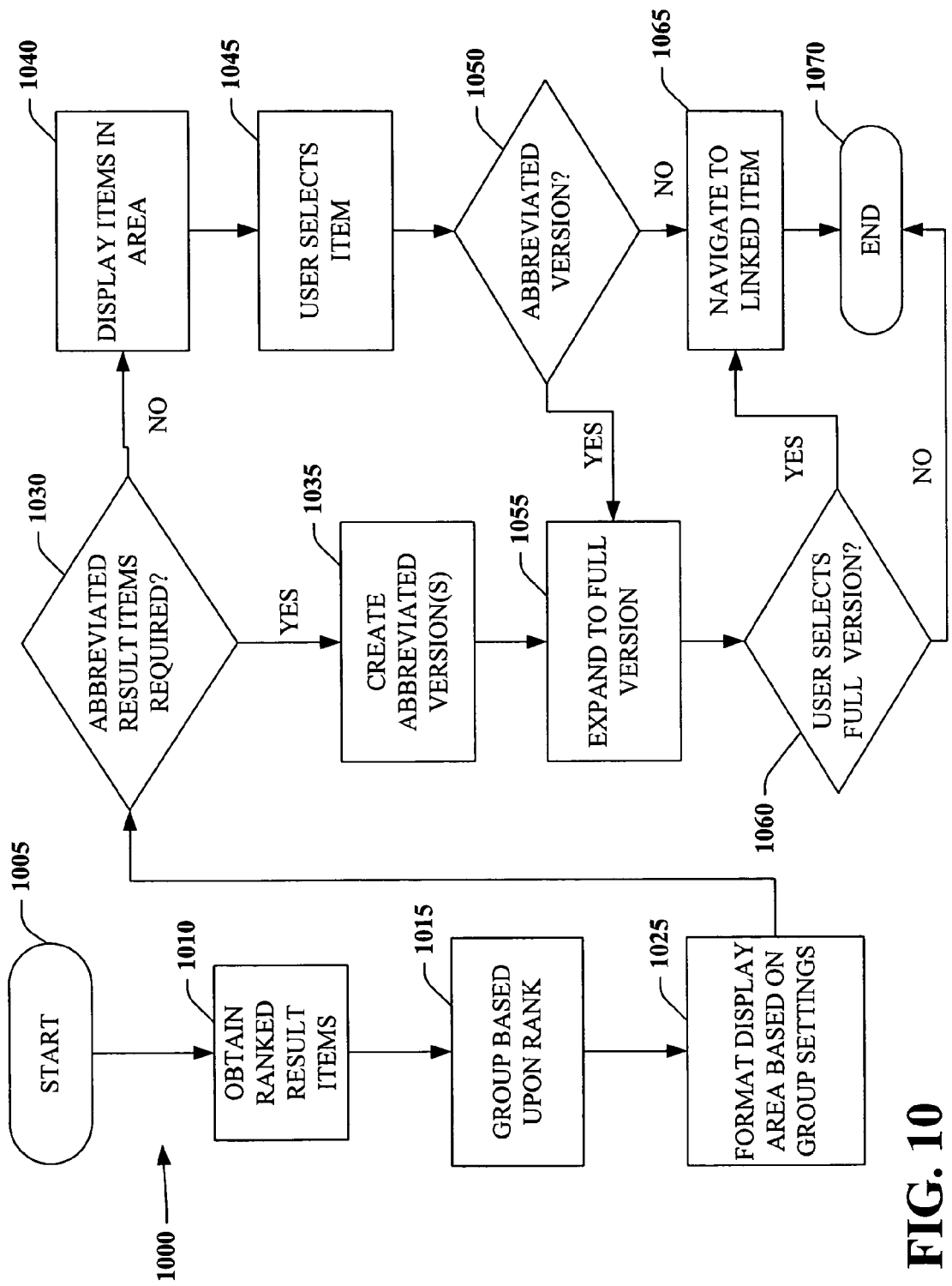
FIG. 10 is a flow diagram of a process in accordance with a still further aspect of the invention.

With reference to FIGS. 9 and 10, there are flowcharts illustrated in accordance with various aspects of the subject invention. While, for purposes of simplicity of explanation, the one or more methodologies shown herein, for example, in the form of flow charts, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

FIG. 9 is a flow diagram of a process in accordance with a further aspect of the invention. The process begins at START block 910 and continues to process block 920 where a ranking of search results that are responsive to a search query is created. At process block 930, the ranked search results are sent to a user interface. The user interface checks group settings defined by a user at process block 940. The user interface also groups the results based on rank at process block 950. Processing then continues to process block 960 where a display area is formatted based upon group settings. Formatting can include setting the amount of area for display as well as setting color information or other indicia for informing a user of a grouping of items. At process block 970, group areas are populated with result items. A determination whether the user has changed group settings is made at decision block 980. If yes, processing continues to process block 940. If no, processing concludes at END block 990.

FIG. 10 is a flow diagram of a process 1000 in accordance with a still further aspect of the invention. The process begins at START block 1005 and continues to process block 1010 where ranked search result items are obtained. At process block 1015, the ranked search results are grouped based on rank. It should be appreciated that grouping can be based upon other factors instead of, or in addition to, rank. Processing then continues to process block 1025 where a display area is formatted based upon group settings. A determination whether the group area requires abbreviated versions of result items is made at decision block 1030. If yes, processing continues to process block 1035 where an abbreviated version is created. If no, and also after processing at process block 1035, processing continues at process block 1040 where items are displayed in their display areas.

A user selects a result item at process block 1045. At decision block 1050, a determination is made whether the result item selected is an abbreviated version. If yes, processing continues to process block 1055 where the abbreviated version is expanded to a full version for the user. Processing then continues to decision block 1060 where it is determined whether the user has selected the full version. If yes, processing continues to process block 1065 where the user navigates to a linked item. If the determination made at decision block 1050 is no, processing also continues at process block 1065. Processing concludes at END block 1070.

Figure 11:
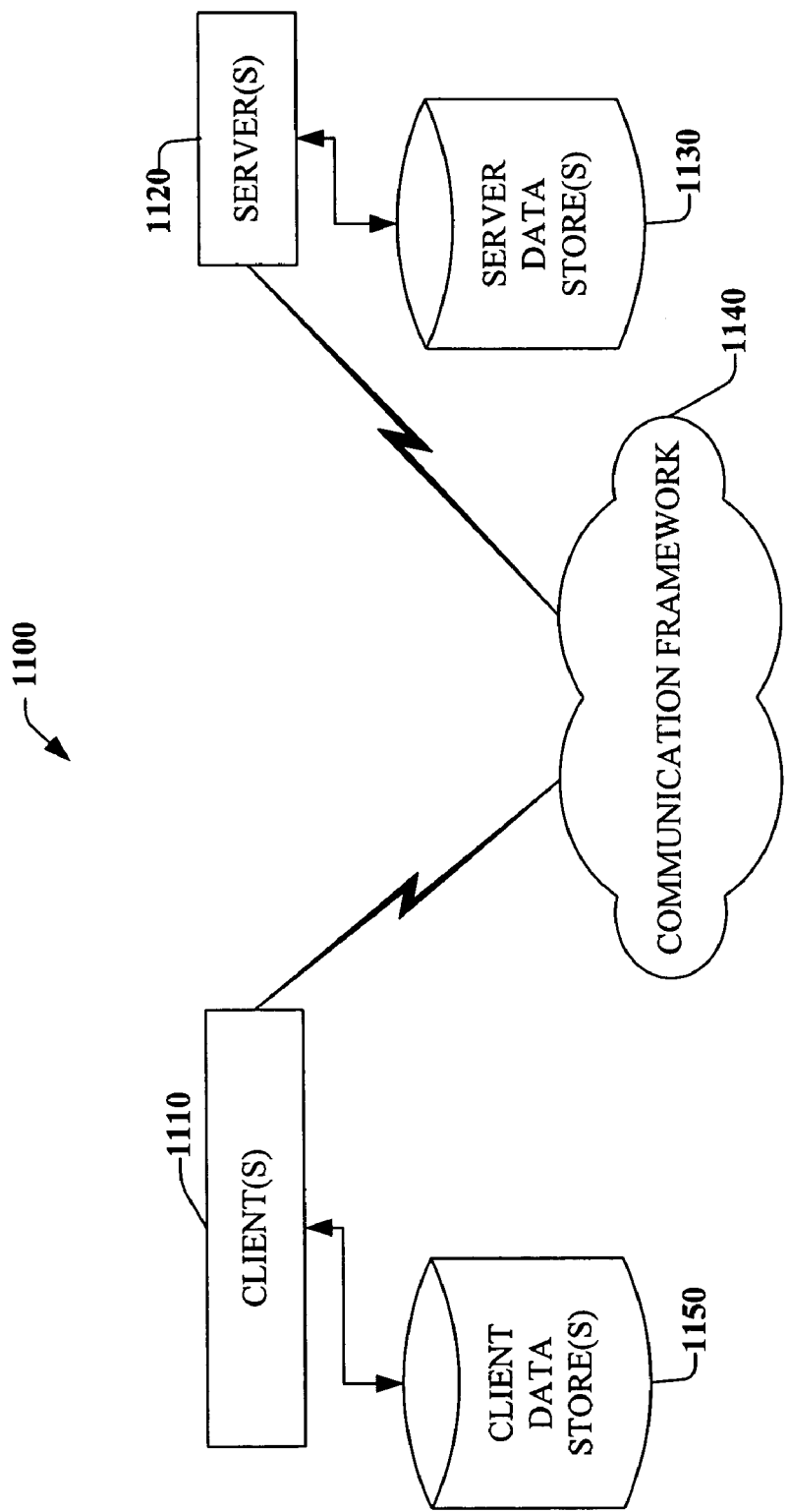
FIG. 11 illustrates an exemplary networking environment, wherein the novel aspects of the subject invention can be employed.
Figure 12:
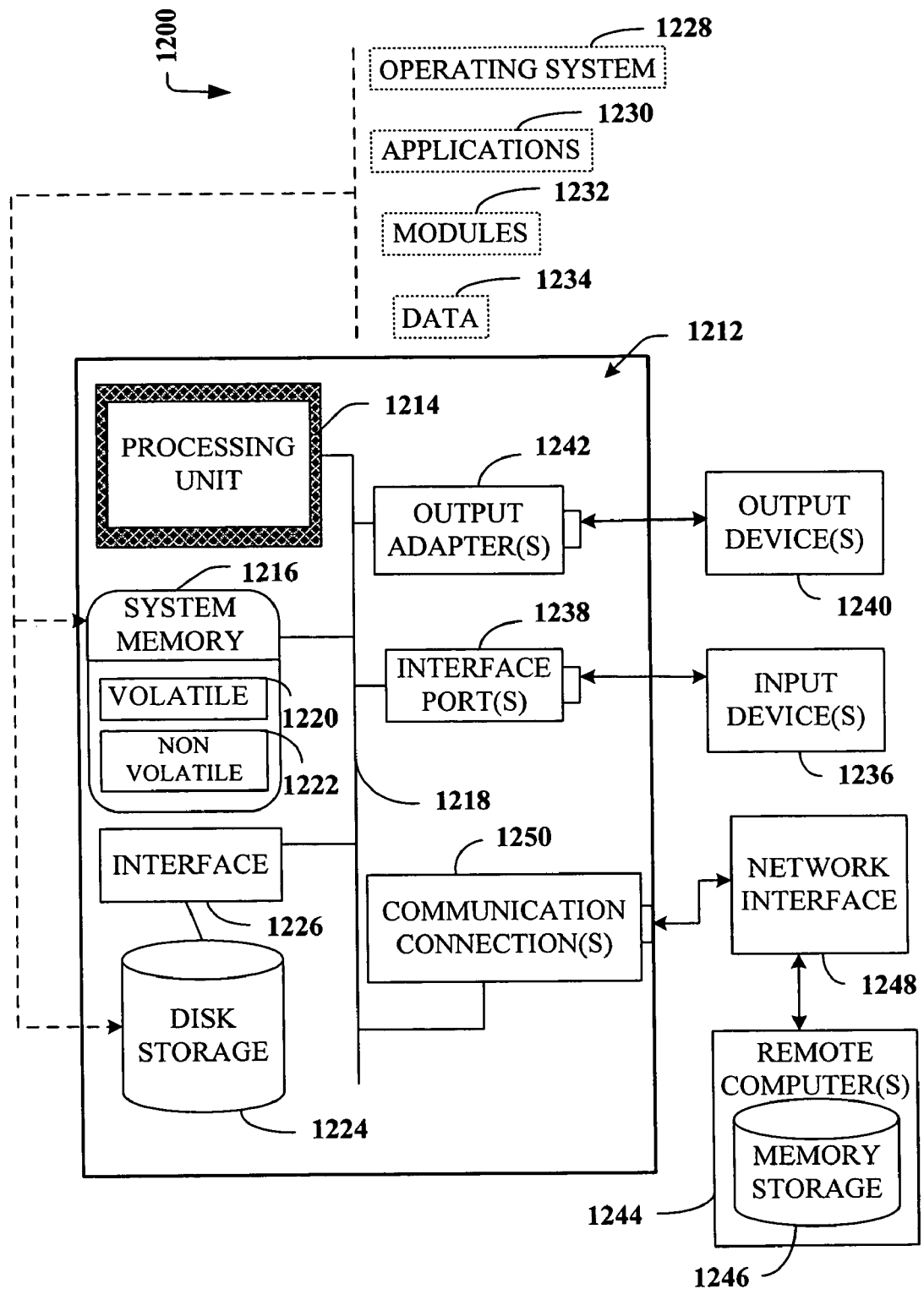
FIG. 12 illustrates an exemplary operating environment, wherein the novel aspects of the subject invention can be employed.

In order to provide additional context for implementing various aspects of the subject invention, FIGS. 11-12 and the following discussion is intended to provide a brief, general description of a suitable computing environment within which various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 11 is a schematic block diagram of a sample-computing environment 1100 with which the subject invention can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads or processes to perform transformations by employing the subject invention, for example.

One possible means of communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1140.

With reference to FIG. 12, an exemplary environment 1200 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. For example, FIG. 12 illustrates a disk storage 1224. The disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. The operating system 1228, which can be stored on the disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. The input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, embodied in a computer-readable storage medium, for displaying information search results to a user, comprising:
    a grouping module that organizes information search results into groups, the information search results are ranked based upon at least one attribute of the information search results;
    a presentation engine that presents the ranked groups of information items search results along with a group indicator;
    a group control module that facilitates bounding the groups based at least in part upon the attribute of the information search results;
    an information condenser that creates an abbreviated version of at least one of the information search results for presentation to the user; and
    an information expander that works with the presentation engine to present a full version of the abbreviated version of the information search results upon receiving an indication of selection of the abbreviated version.

2. The system of claim 1, wherein the attribute of the information search result is a degree of interest function.

3. The system of claim 2, wherein the degree of interest function is based upon at least one of an overall search score, a rank score, a personalized score, a number of links to an information search result, a number of links out from an information search result, and a popularity score.

4. The system of claim 2, wherein the presentation module dynamically changes the presentation of the ranked groups based upon information from the group control module.

5. The system of claim 2, wherein the group indicator is at least one of a color, a line, font style, and a graphical indicator.

6. The system of claim 1, wherein the grouping module further comprises:
    grouping a first subset of the information search results into a first group that is most responsive to the users search request;
    grouping a second subset of the information search results into a second group that is less responsive to the users search request than the first subset; and
    grouping a third subset of the information search results into a third group that is least responsive to the users search request.

7. The system of claim 6, wherein the presentation engine further comprises:
    presenting the first subset of information search results in the first group in a single-column layout as either full versions or abbreviated versions;
    presenting the second subset of information search results in the second group in a dual-column layout as abbreviated versions; and
    presenting the third subset of information search results in the third group in a three-column layout as abbreviated versions.

8. A method for displaying information search results to a user, comprising:
    grouping, by a computing device, ranked elements of a search result into one or more groups based upon a user-selectable attribute of the information search results;
    ranking by the computing device, the one or more groups in relation to each other;
    presenting, by the computing device, the ranked groups to a user;
    bounding, by the computing device, the one or more groups based at least in part upon the user-selectable attribute of the information search results;
    creating, by the computing device, an abbreviated version of at least one of the information search results for presentation to the user; and
    presenting, by the computing device, a full version of the abbreviated version of the at least one the information search results upon receiving an indication of selection of the abbreviated version.

9. The method of claim 8, further comprising adjusting at least one parameter for the one or more groups.

10. The method of claim 9, further comprising regrouping the elements of the search result based at least in part upon the at least one adjusted parameter.

11. The method of claim 10, further comprising assigning a group indicator to each element of the search results.

12. The method of claim 11, further comprising creating a summary of at least one element of the search result.

13. The method of claim 12, further comprising expanding a summary of an element of the search result.

14. A system, embodied in a computer-readable storage medium, for displaying information search results to a user, comprising:
- means for obtaining a plurality of elements by way of a search;
- means for ranking the plurality of elements and grouping the plurality of elements into one or more groups based at least in part upon the ranking of the plurality of elements;
- means for ranking the groups in relation to each other;
- means for presenting the ranked groups to a user;
- means for bounding the groups based at least in part upon a user-selectable attribute of the plurality of elements;
- means for creating an abbreviated version of at least one of the plurality of elements for presentation to the user; and
- means for presenting a full version of the abbreviated version of the at least one of the plurality of elements upon receiving an indication of selection of the abbreviated version.

15. The system of claim 14, further comprising means for adjusting at least one parameter relating to the one or more groups.

16. The system of claim 15, further comprising means for regrouping the elements of the search result based at least in part upon an adjusted parameter.

17. The system of claim 16, further comprising means for assigning a group indicator to each element of the search results.

18. The system of claim 17, further comprising means for creating a summary of at least one element of the search result.

19. The system of claim 18, further comprising means for expanding a summary of an element of the search result.

* * * * *